US012419810B2

(12) United States Patent
Biezanek

(10) Patent No.: US 12,419,810 B2
(45) Date of Patent: Sep. 23, 2025

(54) EVOLVING PACIFIER

(71) Applicant: BIOMIMETIK, Ymeray (FR)

(72) Inventor: Arnaud Biezanek, Ymeray (FR)

(73) Assignee: BIOMIMETIK, Ymeray (FR)

( * ) Notice: Subject to any disclaimer, the term of this patent is extended or adjusted under 35 U.S.C. 154(b) by 28 days.

(21) Appl. No.: 18/694,136

(22) PCT Filed: Sep. 14, 2022

(86) PCT No.: PCT/EP2022/075573
§ 371 (c)(1),
(2) Date: Mar. 21, 2024

(87) PCT Pub. No.: WO2023/046554
PCT Pub. Date: Mar. 30, 2023

(65) Prior Publication Data

US 2025/0127688 A1 Apr. 24, 2025

(30) Foreign Application Priority Data

Sep. 23, 2021 (FR) ....................................... 2110007

(51) Int. Cl.
*A61J 17/00* (2006.01)

(52) U.S. Cl.
CPC ........... *A61J 17/105* (2020.05); *A61J 17/001* (2015.05)

(58) Field of Classification Search
CPC ......... A61J 17/00; A61J 17/001; A61J 17/10; A61J 17/105
See application file for complete search history.

(56) References Cited

U.S. PATENT DOCUMENTS 3,129,709 A 4/1964 Rountree
4,878,496 A 11/1989 Chen
(Continued)

FOREIGN PATENT DOCUMENTS

EP 1275366 A2 1/2003
GB 2259019 A 3/1993

OTHER PUBLICATIONS

English translation of the Written Opinion of the International Searching Authority dated Jan. 2, 2023 for corresponding International Application No. PCT/EP2022/075573, filed Sep. 14, 2022.
(Continued)

*Primary Examiner* — Todd J Scherbel
(74) *Attorney, Agent, or Firm* — David D. Brush; Westman, Champlin & Koehler, P.A.

(57) ABSTRACT

An evolving pacifier, which includes: a mouthpiece intended to be suckled by a child; a handle; at least one base flange having a base thickness and on one side of which the mouthpiece extends to have a suction length L, and on the other side of which the handle extends; and a system for reducing the length L. The reduction system includes at least one first adjustment flange having a passage for the mouthpiece so as to surround the mouthpiece and an element for coupling the first adjustment flange to the base flange so as to have the first adjustment flange on the side of the mouthpiece relative to the base flange. The first adjustment flange has a first adjustment thickness which is at least equal to the base thickness.

7 Claims, 2 Drawing Sheets

(56) References Cited

U.S. PATENT DOCUMENTS

| | | | | |
|---|---|---|---|---|
| 2002/0065537 | A1 | 5/2002 | Bass, Jr. et al. | |
| 2015/0272447 | A1* | 10/2015 | Ford | A61J 17/107 600/549 |

OTHER PUBLICATIONS

International Search Report dated Jan. 2, 2023 for corresponding International Application No. PCT/EP2022/075573, filed Sep. 14, 2022.

Written Opinion of the International Searching Authority dated Jan. 2, 2023 for corresponding International Application No. PCT/EP2022/075573, filed Sep. 14, 2022.

* cited by examiner

[Fig. 1]
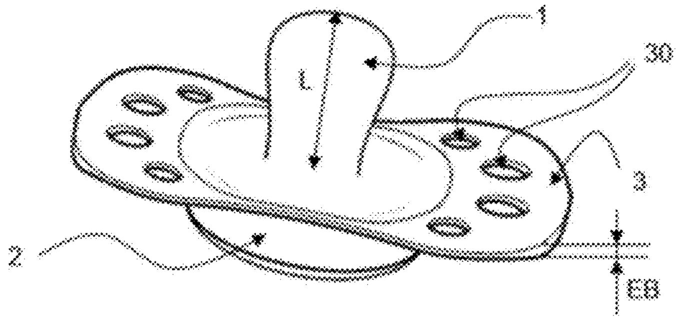
[Fig. 2]
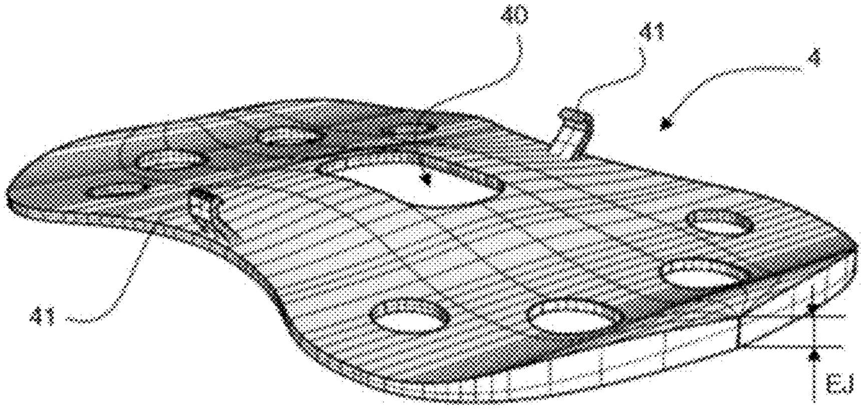
[Fig. 3]
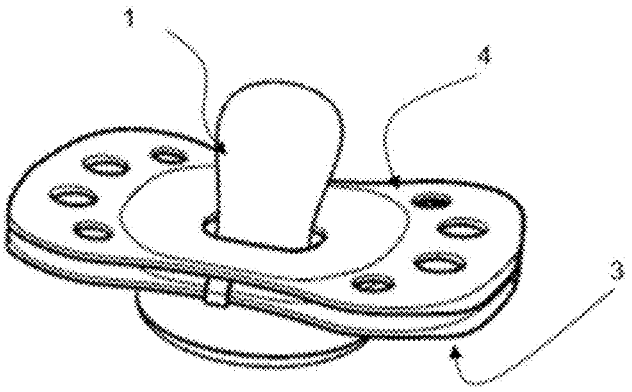

[Fig. 4]
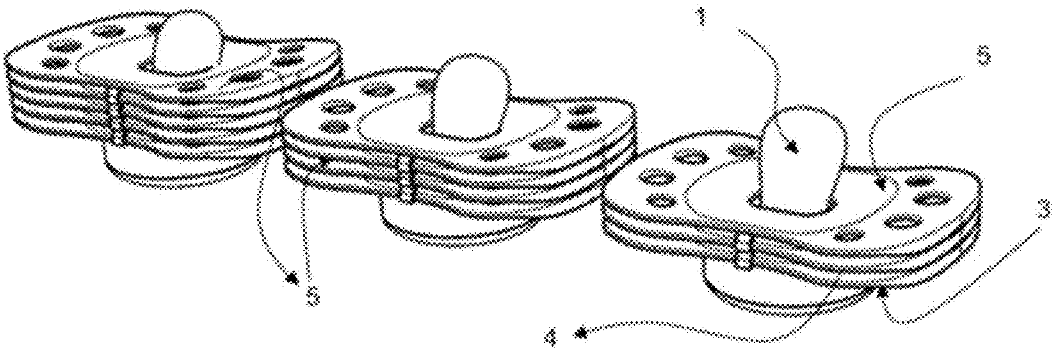

EVOLVING PACIFIER

CROSS-REFERENCE TO RELATED APPLICATIONS

This Application is a Section 371 National Stage Application of International Application No. PCT/EP2022/075573, filed Sep. 14, 2022, and published as WO 2023/046554 A1 on Mar. 30, 2023, not in English, which claims priority to French Patent Application No. FR2110007, filed Sep. 23, 2021, the contents of which are hereby incorporated by reference in their entireties.

FIELD OF THE DISCLOSURE

The field of the disclosure is that of the design and the manufacture of childcare instruments.

More specifically, the disclosure relates to an evolving pacifier, that is to say designed to decrease the length of the mouthpiece intended to be suckled by the child so as to gradually wean the child from the use of the pacifier.

BACKGROUND

In the field of the disclosure, it has been observed that the physiological sucking reflex is present before birth, in utero in the foetus.

This sucking reflex is in fact essential for the development of the infant who feels an innate need to suckle, then to suck, without this being exclusively related to the fact of feeding. Indeed, apart from feedings and any feeling of hunger, sucking reassures and soothes the child.

In other words, apart from the correlation between nutrition and sucking, the latter provides a feeling of comfort. Thus, a distinction is made between the nutritive sucking, whose aim is to satisfy the infant's hunger, and the non-nutritive sucking that the infant will exert on a thumb, a pacifier, a cuddly toy, etc.

However, if sucking has advantages in terms of the infant's well-being, by soothing him, it also has drawbacks, in particular from an orthodontic point of view, this in particular when the sucking reflex is prolonged in the young child.

This drawback tends to be accentuated during the period of eruption of teeth which is accompanied by a strong need for the child to suck and chew something. However, in this case again, sucking is a necessity and a source of intense satisfaction for the child.

The observations of practitioners have shown that, in the long term, sucking the thumb, the pacifier, or the prolonged use of the bottle do not combine well with a good dental development.

Moreover, for many years, an increase in the use of pacifiers has been noted. However, sucking the pacifier turns out to be just as harmful as sucking the thumb. Indeed, the pacifier is inserted between the teeth of the upper and lower jaws and can therefore block the proper development of the front teeth.

However, the pacifier remains less harmful than the thumb for three reasons:

- it deforms less the palate because it is flexible and shorter,
- it can easily be put aside or thrown away, the thumb cannot (always available),
- although it is often lying around, it is generally cleaner than the hands.

The recommended age for getting a child to break the habit of sucking is around 2-3 years old. At this age, the child develops his areas of interest and investigation. This is the age when he walks, speaks, has contact with other children and, depending on the case, goes to school.

If thumb sucking can be allowed up to the age of 4 or 5, beyond this age, it is advisable to start talking about it with the child. In particular, it can be explained to him that, beyond the possible impact on his teeth, the thumb or the pacifier hinders the route of communication (you cannot talk "with your mouth full").

The conclusion is therefore as follows: if the pacifier is essential for the first months, or even the first two years of the child, it becomes an obstacle to the positioning of the tongue (low tongue) and therefore to the widening of the palate, as well as to the normal growth of the oral sphere and the dental positioning.

In order to try to deal with this situation, several solutions have been proposed by the prior art.

In particular, two solutions described by the patent document published under No. US2002065537 are known.

According to a first solution proposed by this document, the pacifier comprises a handle carried by a flange from which a pacifier extends, several pacifiers of different lengths being proposed to be successively replaced, each renewal mouthpiece having a length which is less than that which replaces it. The mouthpieces are therefore removably mounted on the flange such that a first mouthpiece can be removed from the flange and replaced by another mouthpiece which is shorter than the previous one.

A first drawback of this system lies in the fact that it is necessary to manufacture a plurality of pacifiers of different lengths, which proves to be costly in terms of manufacturing and, consequently, tends to increase the acquisition price.

Another drawback lies in the fact that the mouthpieces are removably mounted, with a significant potential risk that one of the mouthpieces is unexpectedly separated from the flange while it is in the child's mouth, who can then swallow this mouthpiece with the possibility of choking.

According to a second solution proposed by the previously mentioned document, the mouthpiece is connected to the handle by an internal tractor member. A rotation of the handle will cause the tractor member to be screwed into the handle, leading to a progressive retraction of the mouthpiece towards the flange, thus reducing its length.

Such a solution involves the implementation of different parts to be manufactured and assembled, which again leads to an increase in the acquisition price of the device.

It is also known the patent document published under the number GB2259019 which describes a pacifier with a mouthpiece to be suckled, and comprising a flange which can be positioned entirely on the mouthpiece to carry out a cleaning, the pacifier not being able to be used by the child to suckle during this cleaning.

It is still known the patent document published under the number EP1275366 which describes a pacifier with a mouthpiece to be suckled, and comprising a pad intended to reproduce the feeling provided by the nipple of a breast.

SUMMARY

An exemplary aspect of the present disclosure relates to an evolving pacifier, of the type comprising:

- a mouthpiece intended to be suckled by a child;
- a handle;
- at least one base flange having a base thickness, on one side of which the mouthpiece extends to have a suction length L, and on the other side of which the handle extends;

a system for reducing the length L, characterised in that the reduction system comprises at least one first adjustment flange having a passage for the mouthpiece so as to surround the mouthpiece and means for coupling the first adjustment flange to the base flange so as to have the first adjustment flange on the side of the mouthpiece relative to the base flange, the first adjustment flange having a first adjustment thickness which is at least equal to the base thickness, and in that it comprises at least one second adjustment flange having a passage for the mouthpiece so as to surround the mouthpiece and means for fastening the second adjustment flange to the first adjustment flange so as to have the second adjustment flange on the side of the mouthpiece relative to the first adjustment flange, the second adjustment flange having a second adjustment thickness which is at least equal to the base thickness.

In this manner, the evolution of the length of the mouthpiece to be suckled decreases by the junction of a second flange on the first flange, creating an extra thickness on the latter and consequently reducing the protruding portion of the mouthpiece to be suckled.

The principle of use for scaling the pacifier is therefore extremely simple, simply involving slipping a second flange around the mouthpiece until pressing it against the first flange and coupling it therewith.

It is noted that the risk of ingestion of small parts with an evolving pacifier according to an exemplary embodiment of the present disclosure is non-existent, or almost non-existent. Indeed, the flange is a part of the pacifier which remains outside the child's mouth. It is designed to abut against the child's lips and generally has dimensions which are greater than the opening of the child's mouth to prevent it from being ingested by the child.

Moreover, an evolving pacifier according to an exemplary embodiment of the present disclosure is particularly simple in design and, as will become clear later, simple and inexpensive to manufacture.

In addition, the implementation of a second adjustment flange allows further reducing the protruding portion of the mouthpiece to be suckled.

Of course, the progressive reduction is performed depending on the thickness of each adjustment flange, which may also require varying the number of adjustment flanges as will appear later.

In addition, it appears from this feature that the second adjustment flange has an operating mode of implementation identical to that of the first adjustment flange, with regard to being slipped around the mouthpiece and being coupled to the flange which precedes it.

According to an advantageous solution, the coupling means are integrated into the first adjustment flange and/or into the base flange.

In this manner, in other words, there are no additional parts to the first adjustment flange or to the base flange to allow the two flanges to be secured together. In this manner, in other words, there are no additional parts to the first adjustment flange or to the base flange to allow the two flanges to be secured together.

According to a preferred solution, the coupling means comprise snap-fitting means integrated into the first adjustment flange.

According to such a design, the assembly of the two flanges to each other can be obtained more simply and quickly, this by ensuring an effective mechanical strength.

Preferably, the first snap-fitting means and the second snap-fitting means are designed to cooperate together in a non-detachable manner.

It is understood that, in this manner, the disassembly of the first adjustment flange from the base flange is not possible, which eliminates any risk of ingestion of the first adjustment flange by the child.

According to an advantageous solution, the first adjustment flange has a contour matched to that of the base flange.

In this manner, the edge of the first adjustment flange is flush with the edge of the base flange, extending in continuity with each other. Thus, it is avoided that the edge of one or the other of the two flanges forms a shoulder which could be unpleasant for the child, or which could constitute a bearing or gripping area to try to separate the two flanges.

According to an advantageous solution, the first adjustment flange and the second adjustment flange are identical.

Thus, savings in terms of manufacturing costs are obtained, to the extent that all adjustment flanges are identical and can therefore be manufactured in large series.

According to a particular embodiment, the pacifier comprises a set of five identical adjustment flanges.

Of course, as previously indicated, the number of these adjustment flanges may vary as much as necessary, in particular, depending on the desired progressiveness, which can result in variations in terms of thickness of the adjustment flanges.

Preferably, the adjustment flange(s) are perforated.

This allows circulating saliva and air between the flanges, allowing a drying between the base and adjustment flanges.

BRIEF DESCRIPTION OF THE DRAWINGS

Other features and advantages will appear more clearly on reading the following description of an embodiment of the present disclosure, given by way of simple illustrative and non-limiting example, and the appended drawings from which:

FIG. 1 schematically illustrates an evolving pacifier according to an exemplary embodiment, side view;

FIG. 2 schematically illustrates an adjustment flange for an evolving pacifier according to an exemplary embodiment;

FIG. 3 schematically illustrates, in a side view, an evolving pacifier on which a first adjustment flange is present;

FIG. 4 schematically illustrates an evolving pacifier according to an exemplary embodiment with different stacks of adjustment flanges.

DETAILED DESCRIPTION OF ILLUSTRATIVE EMBODIMENTS

As illustrated in FIG. 1, an evolving pacifier according to an exemplary embodiment of the present disclosure conventionally comprises:

- a mouthpiece 1 intended to be suckled by a child, such a mouthpiece generally being made of silicone;
- a handle 2;
- a base flange 3, on one side of which the mouthpiece 1 extends having a length L from the base flange 3 to the free end of the mouthpiece, the handle 2 extending on the other side of the base flange relative to the mouthpiece 1.

This base flange has a thickness, called base thickness EB, for example in the range of 1 to 2 mm (this thickness may be the average thickness of the periphery if the thickness thereof is not constant).

According to the principle of an exemplary embodiment, the pacifier comprises at least one first adjustment flange 4 illustrated in FIG. 2. As appears in this figure, this adjustment flange has a central passage 40 allowing the mouthpiece 1 to pass through the passage, such that, once the adjustment flange is mounted on the pacifier, the adjustment flange surrounds the mouthpiece 1.

Furthermore, the adjustment flange has a thickness, called adjustment thickness EJ (this thickness may be the average thickness of the periphery if the thickness thereof is not constant) which is greater than or equal to the base thickness EB.

In addition, the pacifier comprises means for coupling the first adjustment flange 4 to the base flange 3 provided to have the first adjustment flange 4 on the side of the mouthpiece 1 relative to the base flange as shown in FIG. 3.

According to this design of the evolving pacifier according to an exemplary embodiment, the first adjustment flange 4 is mounted on the pacifier by passing the mouthpiece across the passage 40, until it presses the first adjustment flange 4 against the base flange 2.

It is understood that, in this manner, the first adjustment flange forms a system for reducing the length L, in that the protruding portion of the mouthpiece 1 from the base flange is reduced in length by the thickness of the first adjustment flange. In other words, the length of the mouthpiece protruding from the adjustment flange is equal to L-EJ.

According to the present embodiment according to the disclosure, the means for coupling the first adjustment flange 4 with the base flange 3 are directly integrated into the first adjustment flange and/or to the base flange, and preferably only to the adjustment flange.

To do this, the first adjustment flange has, on one of the faces thereof, a pair of hooks 41 facing each other and positioned on either side of the adjustment flange. These hooks are elastically deformable and are designed and produced to allow an assembly by snap-fitting the base flange onto the adjustment flange. Thus, the hooks 41 of the first adjustment flange constitute snap-fitting means.

Preferably, the hooks forming the first snap-fitting means are designed to retain the base flange in a non-detachable manner.

In addition, as appears in FIG. 4, the first adjustment flange 4 has a contour matched to that of the base flange 3. More specifically, the adjustment flange 4 has a shape and dimensions which are identical to those of the base flange 3.

As illustrated in FIG. 4, the evolving pacifier according to an exemplary embodiment comprises at least one second adjustment flange 5 having, just like the first adjustment flange 4, a passage for the mouthpiece 1 so as to surround the mouthpiece, fastening means allow the second adjustment flange to be fastened on the first adjustment flange so as to have the second adjustment flange 5 on the side of the mouthpiece 1 relative to the first adjustment flange 4. To do this, the second adjustment flange(s) have a pair of hooks 41 which are identical to those of the first adjustment flange.

For manufacturing simplification purposes, the first adjustment flange and the second adjustment flange are identical.

As illustrated in FIG. 4, and to ensure greater progressiveness in the reduction of the length L of the mouthpiece, the pacifier comprises a set of five identical adjustment flanges intended to be stacked on top of each other and secured to each other.

As appears in FIGS. 3 and 4, the adjustment flange(s) 4, 5 are perforated, having a plurality of orifices 42.

The base flange 3 can also be perforated, with a plurality of orifices 30, not necessarily placed in correspondence with the orifices of the adjustment flanges.

An exemplary aspect of the present disclosure overcomes at least one of the drawbacks of the prior art.

More specifically, an exemplary embodiment proposes an evolving pacifier which is easy to use, without creating any risk for the child in terms of ingestion of small parts.

An exemplary embodiment proposes such an evolving pacifier which is simple to design and inexpensive to manufacture.

Although the present disclosure has been described with reference to one or more examples, workers skilled in the art will recognize that changes may be made in form and detail without departing from the scope of the disclosure and/or the appended claims.

The invention claimed is:

1. An evolving pacifier, of the type comprising:

a mouthpiece to be suckled by a child;

a handle;

at least one base flange having a base thickness and on one side of which the mouthpiece extends to have a suction length L, and on another side of which the handle extends; and a reduction system for reducing the length L, wherein the reduction system comprises:

at least one first adjustment flange having a passage for the mouthpiece so as to surround the mouthpiece and at least one coupler which couples the first adjustment flange to the base flange so as to have the first adjustment flange on the side of the mouthpiece relative to the base flange, the first adjustment flange having a first adjustment thickness which is at least equal to the base thickness, and at least one second adjustment flange having a passage for the mouthpiece so as to surround the mouthpiece and at least one fastener, which fastens the second adjustment flange to the first adjustment flange so as to have the second adjustment flange on the side of the mouthpiece relative to the first adjustment flange, the second adjustment flange having a second adjustment thickness which is at least equal to the base thickness.

2. The evolving pacifier according to claim 1, the at least one coupler is integrated into the first adjustment flange and/or into the base flange.

3. The evolving pacifier according to claim 2, wherein the at least one coupler comprises at least one snap-fitting element integrated into the first adjustment flange.

4. The evolving pacifier according to claim 1, wherein the first adjustment flange has a contour matched to that of the base flange.

5. The evolving pacifier according t claim 1, wherein the first adjustment flange and the second adjustment flange are identical.

6. The evolving pacifier according to claim 1, further comprising a set of five identical adjustment flanges.

7. The evolving pacifier according to claim 1, wherein the first and second adjustment flanges are perforated.

* * * * *